United States Patent [19]
Forman et al.

[11] 3,984,074
[45] Oct. 5, 1976

[54] FOLDING STAND

[75] Inventors: Tracy H. Forman, Parsipanny; Nat H. Herskowitz, Oakland; Arthur E. Lawida, Westwood, all of N.J.

[73] Assignee: Standit Corporation, Parsippany, N.J.

[22] Filed: May 6, 1975

[21] Appl. No.: 574,956

[52] U.S. Cl. .................. 248/13; 248/166; 248/175; 248/463
[51] Int. Cl.² ........................................ F16M 11/38
[58] Field of Search .............. D26/5 C; D56/4 B; 248/13, 447, 448, 449, 451, 452, 453, 460, 463, 464, 149, 150, 153, 166, 439, 175, 302, 469, 472, 488

[56] References Cited
UNITED STATES PATENTS

| | | | |
|---|---|---|---|
| 506,015 | 10/1893 | Prohl | 248/464 |
| 551,322 | 12/1895 | Kees | 248/464 X |
| 774,264 | 11/1904 | Moreland | 248/449 |
| 980,111 | 12/1910 | Martin | 248/448 X |
| 2,060,308 | 11/1936 | Harding | 248/463 X |
| 2,084,162 | 6/1937 | Packard | 248/175 X |
| 2,388,567 | 11/1945 | Patterson | D56/4 B UX |
| 3,330,524 | 7/1967 | Foley | 248/452 X |
| 3,823,909 | 7/1974 | Thell | 248/175 |
| 3,885,762 | 5/1975 | Sebastiani | 248/13 |
| 3,887,791 | 6/1975 | Kitchens | 235/1 D |

FOREIGN PATENTS OR APPLICATIONS 1,362,630   1964   France .............................. 248/460

*Primary Examiner*—Lawrence J. Staab
*Attorney, Agent, or Firm*—Paul J. Sutton

[57] ABSTRACT

The present invention includes a stand which is capable of gripping and supporting an article in its preferred operative position. The article contemplated may be any one of a number of calculating machines such as, without limitation, a relatively small electronic calculator or the like. In a preferred embodiment, the article and stand become integral such that, upon folding the stand in a manner hereinafter disclosed, the combined article and stand may be carried together for repeated use with one another.

6 Claims, 11 Drawing Figures

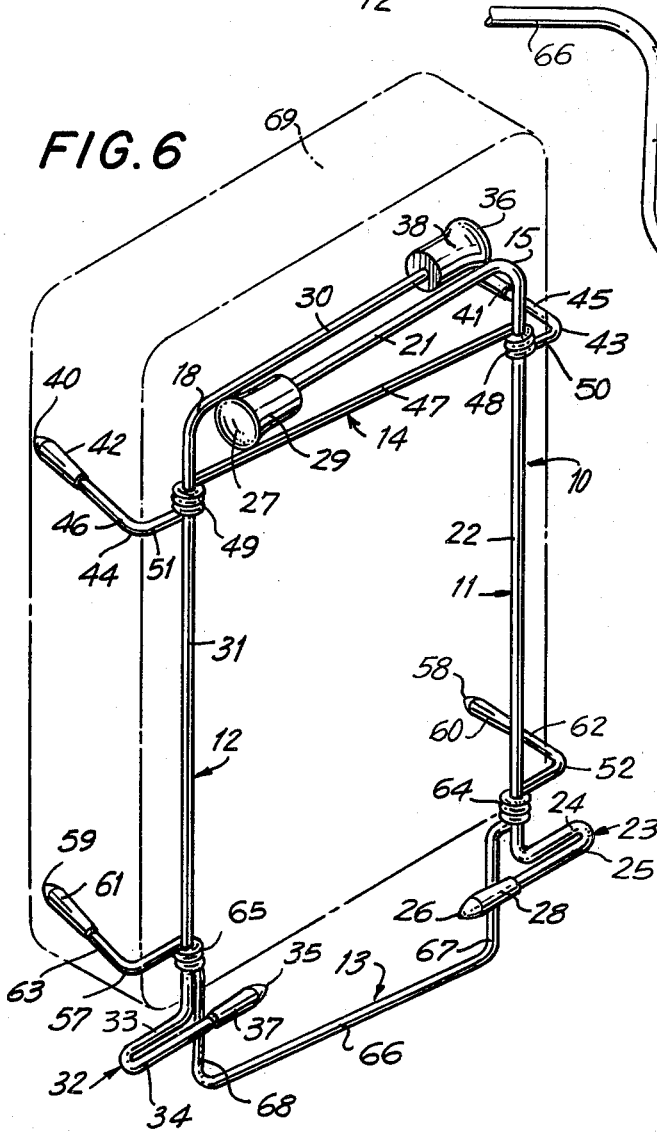
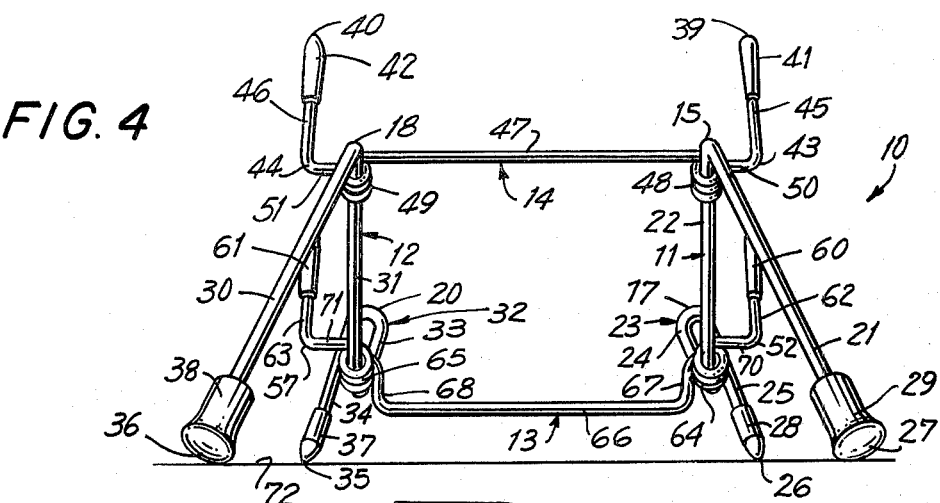
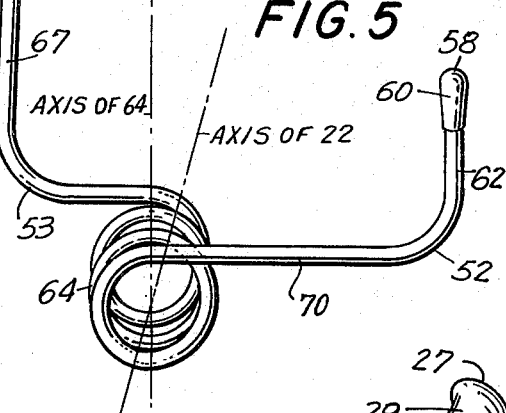
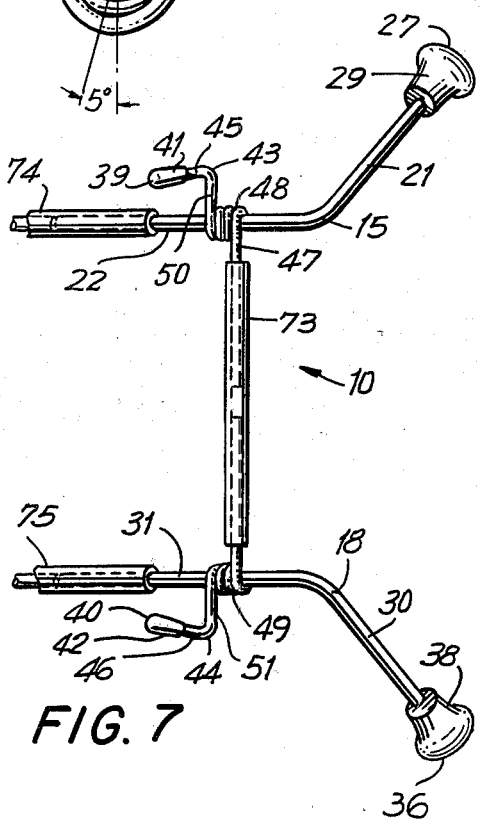

FOLDING STAND

This invention relates generally to stands and supports, and more specifically to folding stands for use with articles to be positioned. While considerable emphasis herein will be made with respect to electronic calculators, this invention should not be limited in any way other than by the appended claims.

The miniature and electronic calculator industry has enjoyed an explosion in sales, with prospects being excellent for even better years ahead. People familiar with this market have estimated that sales volumes will reach six billion dollars by the year 1982. One is hardly able to window shop in business areas without witnessing the proliferation of pocket-size calculators displayed in the windows of a variety of types of retail stores. In fact, office personnel ranging from salesmen to accountants, secretaries to designers, lawyers to clerks all enjoy access to these miniature calculators, some of which are capable of being programmed with relatively sophisticated entries.

Our reason for mentioning this phenomenon, partially made possible by space-age technologies, resides in our recognition of a growing need for a device capable of securely holding these calculators during use thereof, in a position best suited for their efficient and easy use. With few exceptions, the miniature-type electronic calculators being referred to are housed within plastic cases or housings of the injection molded type. A variety of styles, colors and shapes confront the consumer, but in almost every instance, a pocket-size calculator is encased within a relatively smooth housing that will permit its placement into and within the user's pocket or carrying case.

If the reader of this specification has ever used an electronic calculator of this type being described here, or the like, he or she will recall instances in which inherent problems may have arisen, such as: the angle of the machine as it lies flat does not lend itself to easy reading of the digital display; the calculator will not stay in its original position during use, because of components of force of the user's finger in directions parallel with respect to the plane of the support surface on which the calculator rests; the calculator will "rock" when placed upon an uneven or non-flat surface (a misplaced pencil may cause this); and the plane within which the entry buttons or keys of the calculator are situated is not perpendicular to the line of sight of the user.

The foregoing problems have been described in terms of an electronic calculator as an example; however, this invention contemplates overcoming problems of a similar nature in connection with radios, clocks, dictating equipment, writing tablets, desk calendars, telephone directories, games and puzzles, cosmetics cases, telephone equipment, editing apparatus, pipe racks, study aids, tape and multi-media equipment, desk lamps, and instruments of a variety of makes, sizes and uses. We wish to emphatically emphasize here that throughout this specification and the drawings, the use of or reference to electronic calculators is meant only to serve as an example to the reader, and we contemplate using the folding stand that is the subject of the present invention in connection with any number of articles such as, without limitation, those listed in this paragraph above.

Yes, a number of stands have been known for some time now, and new designs periodically enter the marketplace to be used with apparatus of the character described. Conventional stands and supports do serve some useful purposes for which they have evolved — and yet a need exists for folding stand which will both overcome known drawbacks and exhibit the novel and favorable features of this invention. Known or conventional supports do not accomplish these ends.

It is an object of the present invention to provide a folding stand for use with electronic calculators, or the like.

It is a further object of the present invention to provide a folding stand which is capable of gripping and supporting an article in its preferred operative position.

Another object of this invention is to provide a folding stand which is adjustable, such that a plurality of articles of differing sizes and shapes may be accommodated by the folding stand.

Yet another object is to provide a folding stand that is especially suited for use with and in conjunction with electronic calculators, or the like, in which the folding stand grips the calculator in a manner which facilitates the stand's becoming an integral part of the calculator, thereby enabling the user to carry the calculator and stand as a combination.

A still further object of the present invention is to provide an electronic calculator housing which is equipped with folding means capable of elevating portions of this housing, to enable the user of the electronic calculator to utilize the calculator in an operative position. The features of this embodiment of our invention includes providing these folding means as an integral part of the calculator housing itself.

Still another object of this invention is to provide folding means which may be attached to the base of a calculator housing and which may be purchased separately, thereby enabling the user to attach same to the base of the calculator housing to be able to enjoy the folding characteristics described above.

Yet another object is to provide a folding stand for cooperative use with apparatus including, without limitation, electronic calculators, radios, clocks, dictating equipment, writing tablets, desk calendars, telephone directories, games and puzzles, cosmetic cases, telephone equipment, editing apparatus, pipe racks, study aids, tape and multi-media equipment, desk lamps, and instruments of a variety makes, sizes and uses.

Other objects will make themselves apparent from a reading of this specification.

The present invention fulfills the aforementioned objects and overcomes the limitations and disadvantages of prior art solutions to the problems discussed above. According to one aspect of this invention, a folding stand is provided which is capable of gripping and supporting an article such as, without limitation, an electronic calculator. Spaced side members of predetermined bent wire construction have surfaces disposed within a supporting plane. Forward and rearward members of predetermined bent wire construction cooperatively join the said spaced side members to provide a foldable assembly. Upwardly extending, rubber-tipped fingers extend from the plane of said surfaces in a manner which facilitates their contacting and gripping of the side of a calculator housing. Downwardly extending legs form portions of the aforesaid spaced side members, these legs ending in tipped surfaces of a material possessing relatively non-slip, high friction characteristics. Said legs are pivotally supported so as to facilitate their folding toward one another, when desired, their open position being predetermined by limiting means described in more detail below.

The present invention comtemplates expandable side, forward and rearward members to accommodate articles of varying sizes and shapes. However, for convenience, a non-expandable embodiment of the present invention will be more fully described hereinafter.

Our invention will be more clearly understood from the following description of specific embodiments of the invention, together with the accompanying drawings, wherein similar reference characters denote similar elements throughout several views, and in which:

FIG. 4 is a rear elevational view of the folding stand shown in FIGS. 1–3;

FIG. 5 is an enlarged, fragmentary perspective view of a portion of the forward member of the folding stand shown in FIGS. 1–4;

FIG. 6 is a perspective view of the folding stand illustrated in FIGS. 1–4 in its folded condition and attached to an article such as an electronic calculator, or the like, the outline of which is depicted in phantom lines;

FIG. 7 is a fragmentary plan view illustrating the expandable features of the present invention;

Figure 1:
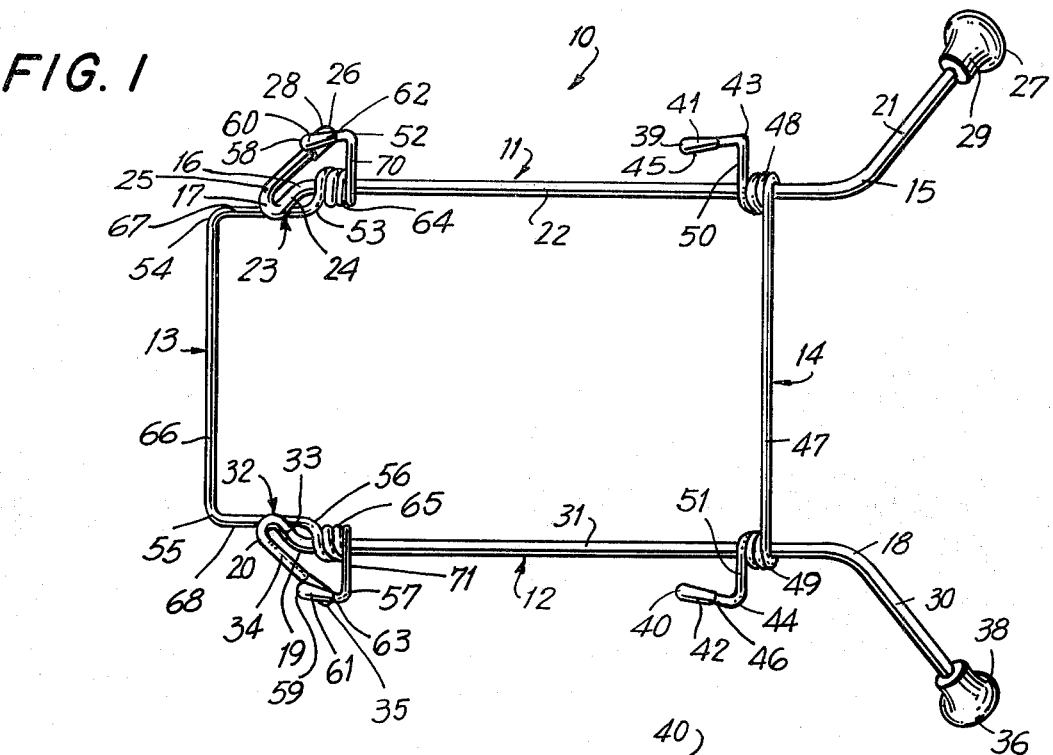
FIG. 1 is a top plan view of the folding stand which comprises the present invention.

Referring now in more details to the drawings, FIGS. 1, 2, 3, 4 and 6 illustrate a folding stand 10, according to one aspect of the present invention. Folding stand 10 is constructed or fabricated of four basic subassemblies, namely, side member 11, side member 12, forward member 13, and rearward member 14.

In a preferred embodiment of this invention, we have chosen to make side members 11 and 12 mirror images of one another for ease in fabrication and attractiveness of design. Also, as will be apparent from the drawings and from the description below, a number of mirror-image bends formed in the sub-assemblies which make up folding stand 10 result in an overall structure which, in its unfolded condition shown in FIGS. 1–4, is basically symmetrical in design.

Looking now at side member 11, we see that 3 bends along its length result in two 90° corners and one 180° corner. For the convenience of the reader, the two 90° corners are indicated with reference numerals 15 and 16, while the 180° bend inside member 11 has been designated reference numeral 17. The reader is to be cautioned that wherever the magnitude of the angle of a bend is given throughout this specification, the number of degrees is either approximate or subject to change, without departing from the scope or spirit of this invention.

Similarly, side member 12 is formed with a 90° bend 18, a 90° bend 19, and a 180° bend 20 along its length. Looking once again at side member 11, the result of these bends 15, 16 and 17 is a more clear definition of portions of side member 11 which can best be described as a leg portion 21, a central portion 22 and a U-shaped portion 23 which, in turn, consists of a shorter leg 24 intermediate bends 16 and 17 and leg 25 which extends from bend 17 to one end 26 of side member 11, end 26 being opposite end 27 thereof. Tips 28 and 29 cover ends 26 and 27, respectively, and are of a non-slip material such as rubber or plastic having a relatively high coefficient of friction. While tips 28 and 29 already described and the other tips of folding stand 10 are depicted in the drawings as being of different sizes and shapes, this invention contemplates using tips of a single size and shape without affecting the functioning of stand 10. Tip 29 is shown to be of a larger size than tip 28, which affords a greater area of contact between tip 29 and the surface upon which stand 10 is supported, as compared with tip 28 and this same supporting surface.

As already suggested, side member 12 is formed with similar component portions. More specifically, bends 18, 19 and 20 divide side member 12 into a leg portion 30, a central portion 31 and a U-shaped portion 32 which, in turn, is made up of a leg 33 extending between bends 19 and 20, and a leg 34 which is longer than leg 33 and which extends between bend 20 and end 35 of side member 12. End 35 is opposite end 36, leg portion 30 extending between bend 18 and end 36. Rubber tips 37 and 38 cover what would otherwise be bare ends 35 and 36, respectively, in the same manner as already described for rubber tips 26 and 27 in the case of side member 11.

Figure 3:
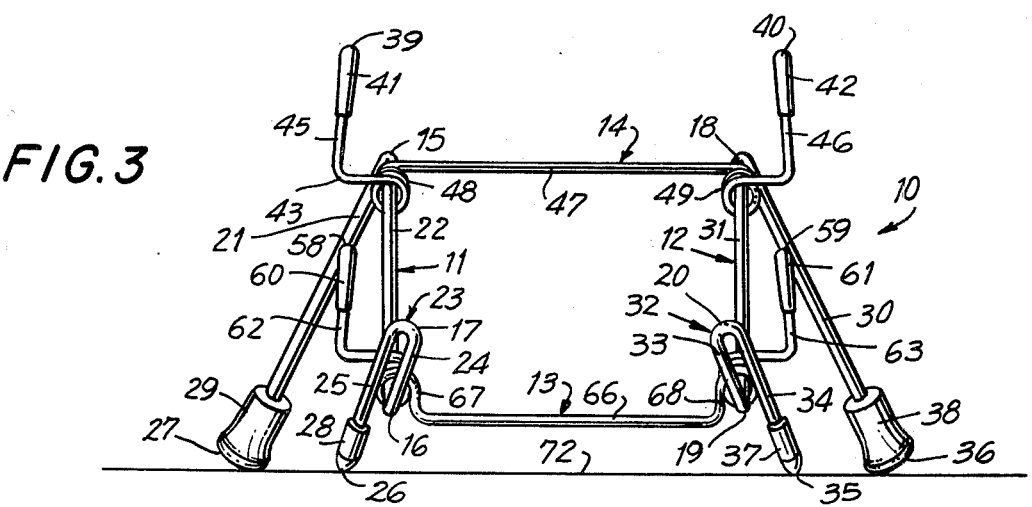
FIG. 3 is a front elevational view of the folding stand shown in FIGS. 1 and 2.

As suggested by FIG. 3, in a preferred embodiment of this invention leg portion 21 is preferably substantially parallel with respect to legs 24 and 25 of U-shaped portion 23, in order to facilitate fabrication and assembly. Similarly, leg portion 30 extends in a substantially parallel relationship with respect to legs 33 and 34 of U-shaped portion 32. The parallelism just described is not necessary in order for folding stand 10 to function according to the present invention and other angles and non-parallel configurations are contemplated hereby.

Rearward member 14 extends between its opposite ends 39 and 40, both of which are covered by rubber tips 41 and 42, respectively. 90° bends 43 and 44 formed in rearward member 14 results in opposite, upturned fingers 45 and 46. A central portion 47 of rearward member 14 interconnects and spans central portions 22 and 31 of side members 11 and 12, respectively. The interconnections of central portion of rearward member 14 with side members 11 and 12 are accomplished by means of wrappings 48 and 49 at opposite ends of central portion 47. Wrappings 48 and 49 consist of a plurality of helically extending windings of wire which makes up rearward member 14 about the wire material which makes up side members 11 and 12. While three complete 369° windings are shown in each of the cases of wrapings 48 and 49, this invention contemplates utilizing more or less windings to accomplish the same result. Wrappings 48 and 49 result in a pivotal type connection which enables the predetermined rotation or pivoting of side members 11 and 12 about their axes of their central portions 22 and 31, respectively.

An extension 50 of rearward member 14 interconnects wrapping 48 and 90° bend 43, while extension 51 interconnects wrapping 49 with 90° bend 44.

As will be described in more detail below, a 5° angle between the axis of wrappings 48 and 49 and the axes of central portions 22 and 31, about which they wind, provides a locking therebetween which prevents the migration of rearward member 14 from its selected position along the lengths of side members 11 and 12. This 5° angle will be described in more detail with respect to FIG. 5, as an example.

Referring now to forward member 13, we can see in FIG. 1, for example, that member 13 is formed with six right-angle bends 52, 53, 54, 55, 56 and 57. Forward member 13 is constructed of wire and its opposite ends 58 and 59 are covered by rubber tips 60 and 61, respectively. Upwardly extending fingers 62 and 63 lie intermediate bends 52 and 57, and ends 58 and 59, respectively. Wrappings 64 and 65 are formed in substantially the same manner as previously described for wrappings 48 and 49. A central portion 66 of forward member 13 extends between bends 54 and 55 and is perpendicular to sides 67 and 68 which, in turn, extend between bends 53 and 54, and 55 and 56, respectively.

It will be noted from FIG. 1, for example, that wrappings 48 and 64 serve as both bearings and hinge means for the rotation of side member 11 about the axis of its central portion 22. This pivotal movement of side member 11 is limited by the purposeful interference between leg 24 and side 67 of forward member 13. The contact realized between leg 24 of U-shaped portion 23 and side 67 serves as a "stop", thereby limiting the angular displacement of end 27 and its associated tip 29 of side member 11 outwardly from the center of folding stand 10. Similarly, wrappings 49 and 65 serve as bearing and hinge means for the pivotal movement of side member 12 about the axis of its central portion 31. As in the case already described for side member 11, this pivotal movement is limited by the interference between leg 33 of U-shaped portion 32 and side 68 of forward member 13.

In operation, the article to be supported and positioned by folding stand 10 is placed and positioned between upstanding fingers 45, 46, 62 and 63, such that rubber tips 41, 42, 60 and 61 engage and grip the sides of the article. In the case of the use of folding stand 10 with an electronic calculator, rubber tips 41, 42, 60 and 61 will frictionally engage the sides of the calculator's housing, represented in phantom outline in FIG. 6 by reference character 69.

The base of the calculator housing is supported by the combination of extensions 50 and 51 of rearward member 14, wrappings 48 and 49, wrappings 64 and 65, and extensions 70 and 71 of forward member 13 which lie between these latter wrappings and bends 52 and 57. The portions of bends 53 and 56 adjacent legs 67 and 68 may, in some circumstances also support the base of calculator housing 69. FIGS. 1-4 illustrate folding stand 10 in its unfolded position. FIG. 6 illustrates folding stand 10 in its folded condition, with leg portions 21 and 30 with pivoted and retracted back substantially against the base of the calculator housing such that the entire housing and folding stand combination may be stored in a preselected and convenient place. When it is desired to use the folding stand 10 in its unfolded position, the user merely between these latter wrappings and bends 52 and 57. The 21 and 30 outwardly from their folded position until the stop effect of contact between legs 24 and 33 against sides 67 and 68 will hold leg portions 21 and 30 at their limit and desired angle.

Figure 2:
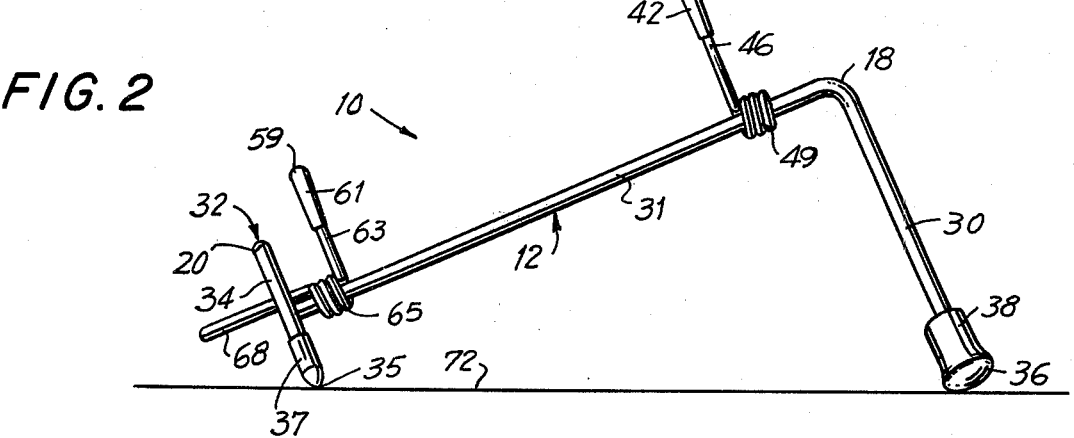
FIG. 2 is a side elevational view of the folding stand shown in FIG. 1.

It can be seen in FIG. 2, for example, that downward forces of the fingers of the user against the keys or buttons of an electronic calculator, for example, will not result in any appreciable forces or components of forces in directions parallel to the surface 72 upon which the folding stand is placed. In this way, sliding and slipping movement is virtually eliminated, with the user enjoying the further advantage of only 4-pointed contact between the stand 10 and surface 72. This will facilitate the straddling of objects on surface 72 which might otherwise interfere with placement of housing 69 thereon. It is also contemplated that the space beneath the unfolded stand 10 may be utilized for notes, references or other accessories to be used in connection with stand 10. FIG. 6 best illustrates folding stand 10 in its folded position.

FIG. 5 illustrates the 5° angular difference between the axes of wrapping 64 and central portion 22. A gripping action is facilitated by the helical wrapping 64 at a 5° difference from the member being wrapped about, in this case central portion 22. This feature is incorporated in each of wrappings 48, 49, 64 and 65 in a preferred embodiment of the present invention. However, this angle may change and parallelism is contemplated as well.

FIG. 7 illustrates one of several different embodiments of the present invention wherein the central portions 22 and 31 of side members 11 and 12, as well as the central portions 47 and 66 of rearward and forward members 14 and 13 may be expandable to accommodate different sizes and shapes of calculators or other articles to be supported by folding stand 10. Hollow tubings 73, 74 and 75 envelope central portions 47, 22 and 31, respectively, of folding stand 10. By central portions 47, 22 and 31 being severed midway between their lengths, the severed ends may be separated from one another while still being supported within their respective tubings, thereby facilitating a separation of the finger members that will grip the article to be supported by folding stand 10. FIG. 7 is fragmentary and it is, of course, contemplated that central portion 66 be severed and encircled by tubing of the type already described for hollow tubings 73, 74 and 75. It is within the scope and spirit of this invention for there to be other types of separating means, including, for that matter, wrappings of the type already described.

Figure 8:
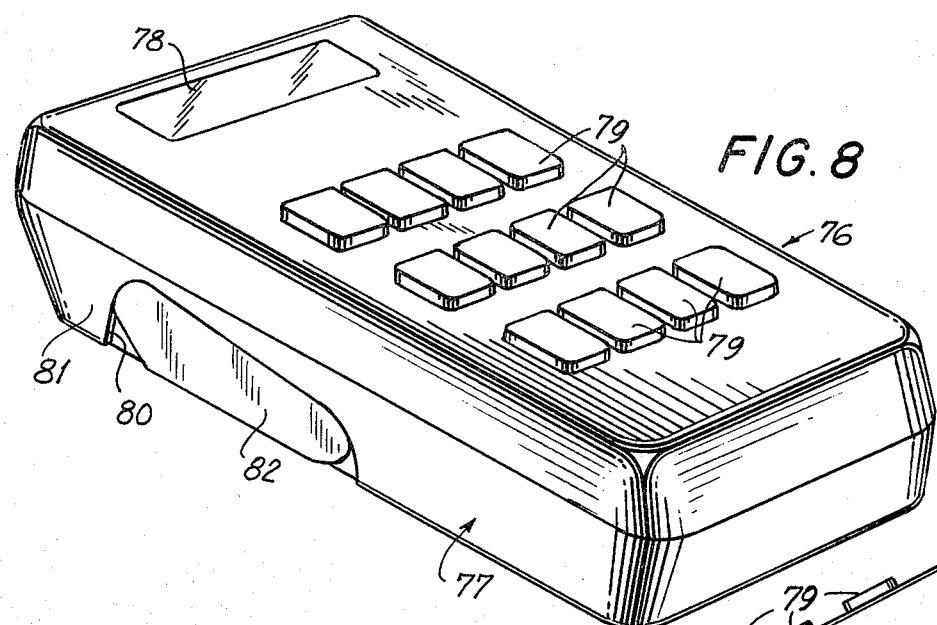
FIG. 8 is a perspective view of a calculator and its housing which incorporates a folding-leg feature of the present invention.
Figure 9:
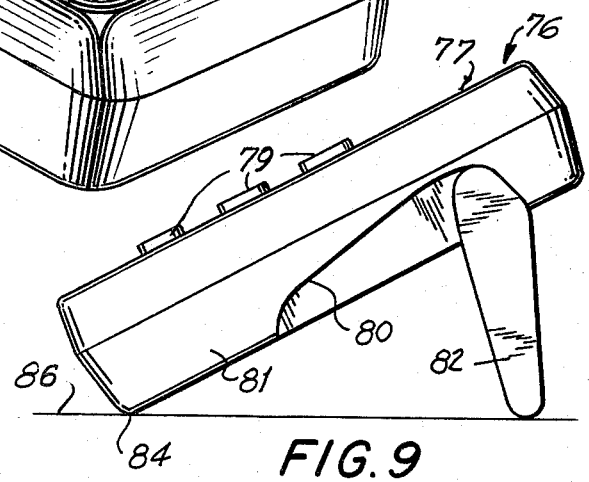
FIG. 9 is a side elevational view of the calculator shown in FIG. 8, with its legs unfolded such that the calculator is disposed in an operative position.

FIGS. 8 and 9, and 10 and 11, respectively illustrate additional embodiments of this invention in which alternative means are provided for supporting and positioning an electronic calculator, for example, for use. FIG. 8 illustrates an electronic calculator 76 which comprises a casing 77 which is preferably made of plastic material. A display window 78 provides the user with access to the digital information displayed therewithin, and buttons or keys 79 provide the means by which information is fed into the computer.

Situated within a recess 80 formed in sides 81 of housing 77 are retractable and pivotally supported housing legs 82. Legs 82 are disposed on either side of housing 77 and may be retracted into the position shown in FIG. 8 or pivoted to their operative position shown in FIG. 9, whereupon the extremities 83 of housing legs 82 and the front housing base corner 84 support calculator 76 upon a supporting surface 86. Thus, when desired, legs 82 may be swung from their respective recesses 80 to the position shown in FIG. 9 and the calculator may be used as long as desired.

This invention contemplates legs 82 having finite and preselected positions within which they may be set, thereby eliminating the possibility of their accidentally folding into their recesses and causing calculator 76 to fall, thereby causing damage. Detents may be formed on the inner surfaces of legs 82, these detents sitting within a plurality of recesses and being urged thereto by means of one or more tension springs secured to the inner surfaces of legs 82.

Figure 10:
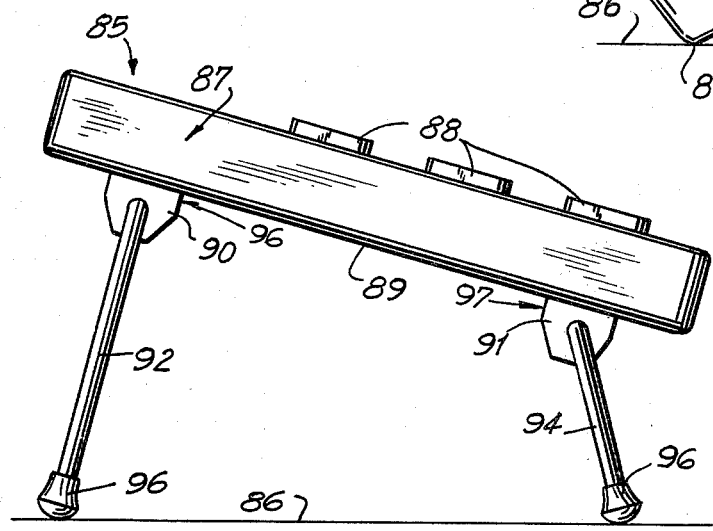
FIG. 10 is a side elevational view illustrating another embodiment of the present invention which utilizes separate foldable leg attachments for use upon the base of calculator housings.
Figure 11:
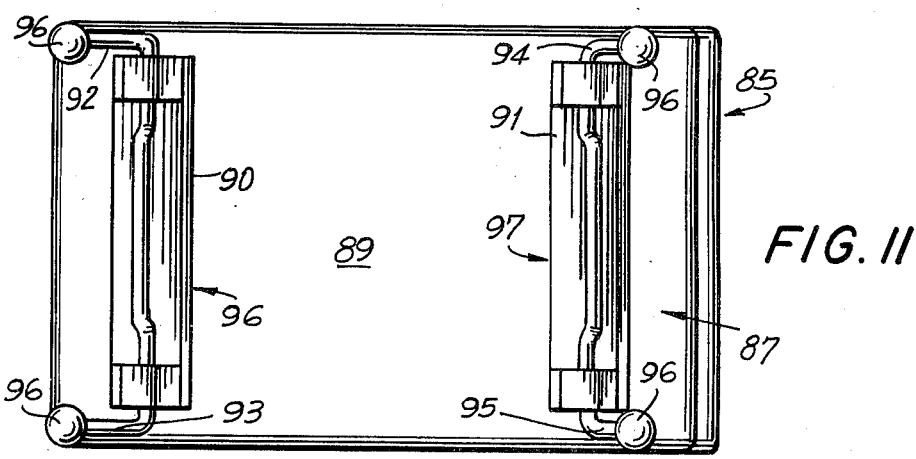
FIG. 11 is a bottom plan view of the embodiment of the present invention shown in FIG. 10.

In FIGS. 10 and 11, yet another alternative embodiment of the invention provides additional means whereby a calculator 85 may be supported upon supporting surface 86 for normal use. For convenience, reference numeral 87 designates the housing of calculator 85; numeral 88 designates the keys of this same calculator; and numeral 89 designates the bottom or base of housing 87. A pair of support members 90 and 91 are formed with openings through which wire-formed, pivotally supported pairs of legs 92 and 93, and 94 and 95 are mounted. These legs terminate in rubber tips 96, which are of the nonslip variety described above and which support calculator 85 upon surface 86. The combination of support member 90 and its associated legs 92 and 93 comprise subassembly 96, while the combination of support member 91 and its associated legs 94 and 95 comprise subassembly 97. Subassemblies 96 and 97 are provided separately from calculator 85 according to the present invention and may be attached, such as by glue, epoxy, Velcro, or other attaching means to either calculator 85 or any other which the user wishes to support. When not in use, legs 92, 93, 94 and 95 may be swing toward base 89 of housing 87 such that they are in a folded position (not shown in the drawings).

The U-shaped configurations 23 and 32 of folding stand 10 also serve as a stop or rest against which the article supported by the stand may come to bear. In this way, the article may be supported by six support points in three vertical planes, with the inclined slope of the supporting "plane" making a fourth vertical plane of support unnecessary, due to gravity alone.

The embodiments of the invention particularly disclosed and described are presented merely as examples of the invention. Other embodiments, forms and modifications of the invention coming within the proper scope and spirit of the appended claims will, of course, readily suggest themselves to those skilled in the art.

What is claimed is:

1. A collapsible-type device for supporting an article to be viewed upon a surface, comprising, in combination, first and second longitudinal members each extending at an angle with respect to the surface during use of the device, first and second transverse members each extending between and at an angle with respect to said longitudinal members, each of said transverse members having a portion thereof extending in substantially wrapped relationship at least once about and in contact with a portion of one of said longitudinal members, at least one of said transverse members including a bearing surface and further including two gripping portions for frictionally holding an article therebetween, forward and rearward leg portions integral with each of said longitudinal members, a limit portion of one of said leg portions being movable from a collapsed position to a limit position in contact with said bearing surface, the presence of said bearing surface obstructing and limiting the movement of said limit portion, each of said forward and rearward leg portions including a tip portion adapted to engage and rest upon a surface when said limit portion is in contact with said bearing surface.

2. A device according to claim 1, wherein said first longitudinal member comprises an integral element a first forward leg portion, a first rearward leg portion, a first limit portion, and first forward and rearward tip portions.

3. A device according to claim 2, wherein said second longitudinal member comprises as an integral element a second forward leg portion, a second rearward leg portion, a second limit portion, and second forward and rearward tip portions.

4. A device according to claim 3, wherein each of said transverse member comprises a pair of upstanding fingers having gripping surfaces for engaging and holding said article therebetween.

5. A device, according to claim 1 wherein said longitudinal and transverse members are constructed of wire.

6. A device, according to claim 1, wherein the width of said device is expandable and wherein the length of said device is expandable.

* * * * *